United States Patent
Ko et al.

(10) Patent No.: US 8,615,722 B2
(45) Date of Patent: Dec. 24, 2013

(54) APPARATUS AND METHOD FOR PROVIDING PREVIEW OF MENU OBJECT

(75) Inventors: Hye-kyung Ko, Incheon (KR); Min-ho Shin, Seoul (KR); Sun-il Choi, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 869 days.

(21) Appl. No.: 11/871,771

(22) Filed: Oct. 12, 2007

(65) Prior Publication Data
US 2008/0195975 A1 Aug. 14, 2008

(30) Foreign Application Priority Data
Feb. 8, 2007 (KR) ........................ 10-2007-0013369

(51) Int. Cl.
*G06F 3/048* (2013.01)

(52) U.S. Cl.
USPC ............ 715/860; 715/810; 715/821; 715/822

(58) Field of Classification Search
USPC ................... 715/810, 860, 821, 822
See application file for complete search history.

(56) References Cited

U.S. PATENT DOCUMENTS

| | | | | |
|---|---|---|---|---|
| 5,689,628 A | * | 11/1997 | Robertson | 345/427 |
| 2005/0050156 A1 | * | 3/2005 | Suzuki et al. | 709/217 |
| 2005/0146639 A1 | * | 7/2005 | Onuki | 348/371 |
| 2006/0265669 A1 | * | 11/2006 | Lee | 715/818 |
| 2007/0226650 A1 | * | 9/2007 | Hintermeister et al. | 715/822 |
| 2007/0300140 A1 | * | 12/2007 | Makela et al. | 714/799 |
| 2008/0066010 A1 | * | 3/2008 | Brodersen et al. | 715/810 |

FOREIGN PATENT DOCUMENTS

| | | |
|---|---|---|
| JP | 09-055895 A | 2/1997 |
| JP | 2004-134847 A | 4/2004 |
| JP | 2005-323395 A | 11/2005 |
| KR | 10-2002-0048776 A | 6/2002 |
| KR | 10-2002-0049791 A | 6/2002 |
| KR | 1020040065053 A | 7/2004 |
| KR | 1020050073020 A | 7/2005 |
| WO | 2005067284 A1 | 7/2005 |

OTHER PUBLICATIONS

Communication dated Feb. 5, 2013 issued by the Japanese Patent Office in counterpart Japanese Patent Application No. 2007-211436.
Office Action, dated Sep. 25, 2012, issued by the Korean Intellectual Property Office in counterpart Korean Application No. 10-2007-0013369.
Communication, dated Feb. 14, 2012, issued by the Japanese Patent Office in corresponding Japanese Application No. 2007-211436.

* cited by examiner

*Primary Examiner* — Omar Abdul-Ali
(74) *Attorney, Agent, or Firm* — Sughrue Mion, PLLC

(57) ABSTRACT

Provided are an apparatus and method for providing a preview of a menu object in a technique of displaying a menu object. The apparatus includes an input unit that receives an event from a user, an event processing unit that highlights objects, from among objects displayed on a screen, to which a user input can be applied according to the received event, and a display unit that displays the highlighted objects.

10 Claims, 5 Drawing Sheets

//APPARATUS AND METHOD FOR PROVIDING PREVIEW OF MENU OBJECT

CROSS-REFERENCE TO RELATED APPLICATIONS

This application claims priority from Korean Patent Application No. 10-2007-0013369 filed on Feb. 8, 2007 in the Korean Intellectual Property Office, the disclosure of which is incorporated herein by reference in its entirety.

BACKGROUND OF THE INVENTION

1. Field of the Invention

Apparatuses and methods consistent with the present invention relate to a technique of displaying a menu object, and more particularly, to providing a preview of a menu object.

2. Description of the Related Art

Digital TVs are capable of receiving two types of key events: an Abstract Windowing Toolkit (AWT) KeyEvent, and a UserEvent of the Multimedia Home Platform (MHP). An AWT KeyEvent is available for only user interface (UI) objects, and a UserEvent is an application program interface (API) that allows a key event to be available for objects rather than UI objects. Thus, in a UI application of the digital TV, the AWT KeyEvent can be used in constructing a menu or a key event can be provided using the UserEvent.

Also, in a Java UI application for use in digital TVs, an object corresponding to a key event is registered using an API call provided by middleware. Then, when a user selects a predetermined key via an input device, such as a remote controller, a key event is generated, and the middleware provides the key event to registered objects.

As illustrated in FIG. 1, selectable objects 10 are present on a screen of a digital TV, and it is possible to move a selector from one of the objects 10 to a neighboring object 10 using up, down, left and right arrow keys.

For example, when one of the up, down, left and right arrow keys is selected after a specific object is activated, a new object located in the direction of the selected arrow key is activated, that is, the selector is moved to the new object. Here, an application for the digital TV supports an API that allows movement between selectable objects using the arrow keys. In this case, an application programmer registers a specific object, and objects to which a selector can be moved from the specific object in an upward, downward, left, or right direction, using the API.

However, an application for a digital TV must be downloaded for each broadcast, and thus, a user may have difficulties in getting accustomed to a new menu whenever he or she uses a new UI application.

While there is a manual of a PC application which can be received in a document format, but there is no manual of an application for broadcasting. Thus, a user must manipulate the application for broadcasting to learn how to use a menu through manipulation of a remote controller by himself/herself in real time.

In particular, since a unified UI does not exist, many application programmers have produced various types of UIs, and a large number of existing applications are actually manufactured such that a menu cannot be recognized at a first glance. Accordingly, if a user has never used an application before, the user cannot recognize at first glance the result of selecting an up, down, left or right arrow key.

In addition, if a TV system has low performance or an application is complicated, a user may misunderstand that an operation corresponding to movement between menus is not performed due to a delay time during the movement.

Korean Patent Laid-Open Publication No. 2002-0048776, entitled "Method of Executing Help Function in Digital Television Receiver", discloses displaying main help items including the titles of external elements of a digital TV receiver on a first area of a screen when a user pushes a help button, indicating one of the titles of the external elements with a cursor as the user manipulates cursor buttons, displaying a detailed configuration of the external element indicated by the cursor on a second area of the screen, indicating a part of the detailed configuration displayed by the cursor as the user manipulates the cursor buttons, and displaying a help description of the indicated part on a third area of the screen. However, the above publication does not describe a technique of providing a preview of a menu object.

SUMMARY OF THE INVENTION

The present invention provides an apparatus and method for providing a preview of a menu object.

The above and other objects of the present invention will be described in or be apparent from the following description of the preferred embodiments.

According to an aspect of the present invention, there is provided an apparatus for providing a preview of a menu object, the apparatus including an input unit that receives an event from a user, an event processing unit that highlights an object, from among objects displayed on a screen, to which a user input can be applied according to the received event, and a display unit that displays the highlighted object.

According to another aspect of the present invention, there is provided a method of providing a preview of a menu object in a display unit, the method including receiving an event from a user, highlighting objects, from among a plurality of objects displayed on a screen, to which a user input is to be applied according to the received event, and displaying the highlighted objects.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY EMBODIMENTS

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided such that this disclosure will be thorough and complete and will fully convey the concept of the invention to those skilled in the art, and the present invention will only be defined by the appended claims.

Hereinafter, exemplary embodiments of the present invention will be described in detail with reference to the accompanying drawings.

Figure 1:
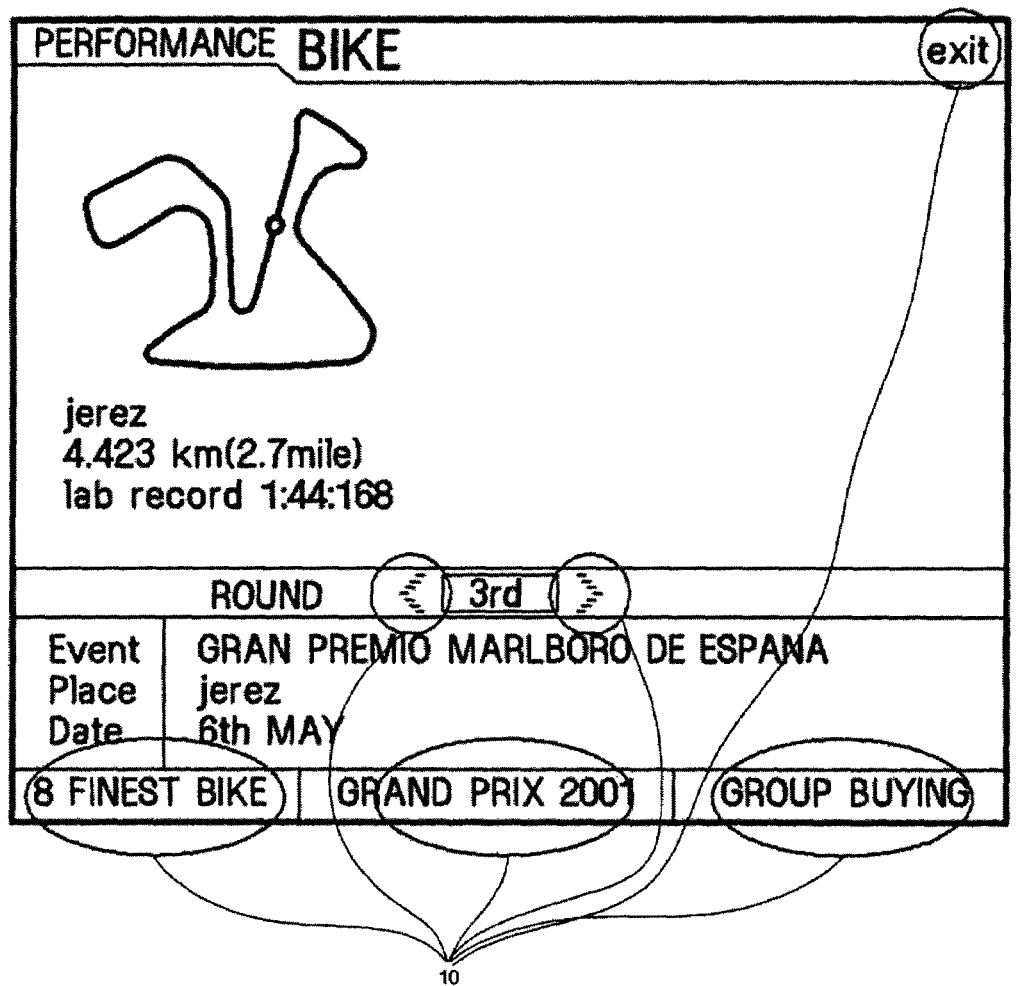
FIG. 1 is a diagram illustrating objects displayed on a related art digital television (TV)
Figure 2:
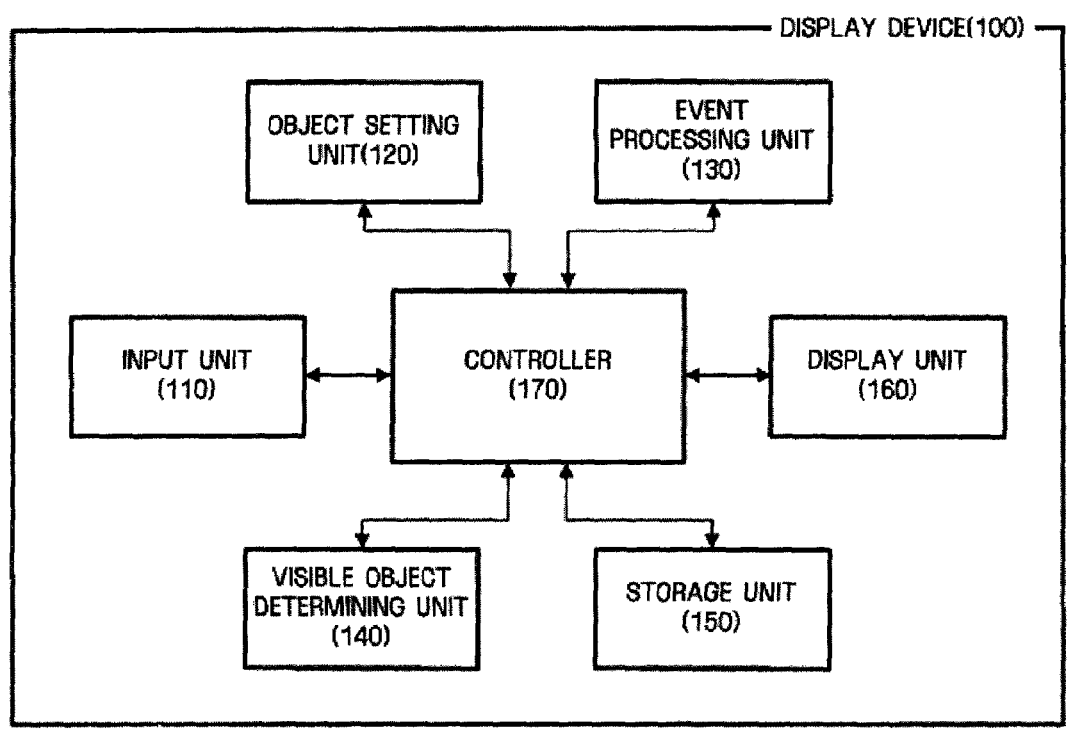
FIG. 2 is a block diagram of an apparatus for providing a preview of a menu object, according to an exemplary embodiment of the present invention.

FIG. 2 is a block diagram of an apparatus for providing a preview of a menu object, according to an exemplary embodiment of the present invention.

As illustrated in FIG. 2, a display device 100 includes an input unit 110, an object setting unit 120, an event processing unit 130, a visible object determining unit 140, a storage unit 150, a display unit 160, and a controller 170. The display device 100 may be a digital television (TV), a personal computer (PC), a Digital Multimedia Broadcasting (DMB) receiver, or a portable multimedia player (PMP).

The input unit 110 receives a key signal generated by a user. Here, the user generates a predetermined key signal (hereinafter referred to as a "key event") by manipulating a remote controller, a keyboard, or a mouse. For example, the key event denotes a request for a menu preview, a request for registration of an object, or a request for operation of a predetermined function (volume control, channel change, etc.).

If a user makes request for registration of an object which is to operate via the input unit 110 when a predetermined key event is generated, the object setting unit 120 registers the object and sets an operation corresponding to the registered object. That is, when the user generates a predetermined key event, the operation of the object corresponding to the generated key event is performed.

For example, the registration of an object corresponding to a key event means that the object is registered using addKeyListener of a component class, addUserEventListener of an event manager class, or addExclusiveAccessToAWTEvent.

Also, the object setting unit 120 checks UI objects from among registered objects, and stores the UI objects separately in the storage unit 150.

For example, the object setting unit 120 checks UI objects from among registered objects. Here, whether an object is a UI object may be determined by checking whether the object is a child object of a component class.

That is, since a UI object is a child class of a component class, if a method for the component class, i.e., an instance of component( ), has a 'true' value, the object may be determined to be a UI object, and if the method for the corresponding object has a 'false' value, the object may be determined not to be a UI object. Here, a UI object is separately stored in a UI storage module (not shown) of the storage unit 150.

When a key event generated by a user is input to the event processing unit 130, the event processing unit 130 determines the type of the input key event and performs an operation corresponding to the determined type.

For example, when a generated key event is input to the event processing unit 130, the event processing unit 130 determines whether the input key event requests a menu preview. If it is determined that the input key event requests the menu preview, the event processing unit 130 requests the visible object determining unit 140 to detect a visible object from among objects displayed in a screen image that is currently reproduced on the display device 100.

Also, when the event processing unit 130 receives from the visible object determining unit 140 information regarding the visible object displayed on the currently reproduced screen image, and the visible object is highlighted. Here, the visible object may be highlighted with various colors and in various formats. According to another exemplary embodiment of the present invention, it is possible to indicate that the visible object is a menu object using various indication methods, rather than highlighting the visible object.

In response to a request from the event processing unit 130, the visible object determining unit 140 searches UI objects stored in the storage unit 150 for the objects displayed on the currently reproduced screen image, and determines which one of the searched-for objects is a visible object. Here, whether an object is a visible object or an invisible object may be determined by a value of a method for a component class, i.e., isVisible( ). Here, the visible object denotes an object that is visually displayed on a screen, and the invisible object denotes an object that is hidden and thus cannot be seen on the screen.

For example, if a value of the method for an object is 'true', the object is a visible object, and if the value of the method for the object has a 'false' value, the object is an invisible object.

The storage unit 150 stores information regarding the objects provided to the display device 100. For example, the information regarding an object may be the location, size, color, and identification (ID) of the object. Also, the storage unit 150 stores various information regarding highlighting, e.g., shape, color, size, etc.

Also, the storage unit 150 includes a UI storage module that separately stores only UI objects from among the objects provided to the display device 100. Here, the reason for separate storing of UI objects in the UI storage module is to rapidly display a desired UI object on the screen when a user inputs a key event for a menu preview.

The display unit 160 displays a plurality of objects, and provides highlighting of objects and displaying of predetermined multimedia data on the screen of the display device 100.

The controller 170 controls the operations of the functional blocks 110 through 160 of the display device 100.

Meanwhile, the term 'unit', as used herein, means, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. In addition, the components and units may be implemented such that they execute one or more computers in a communication system.

Figure 3A:
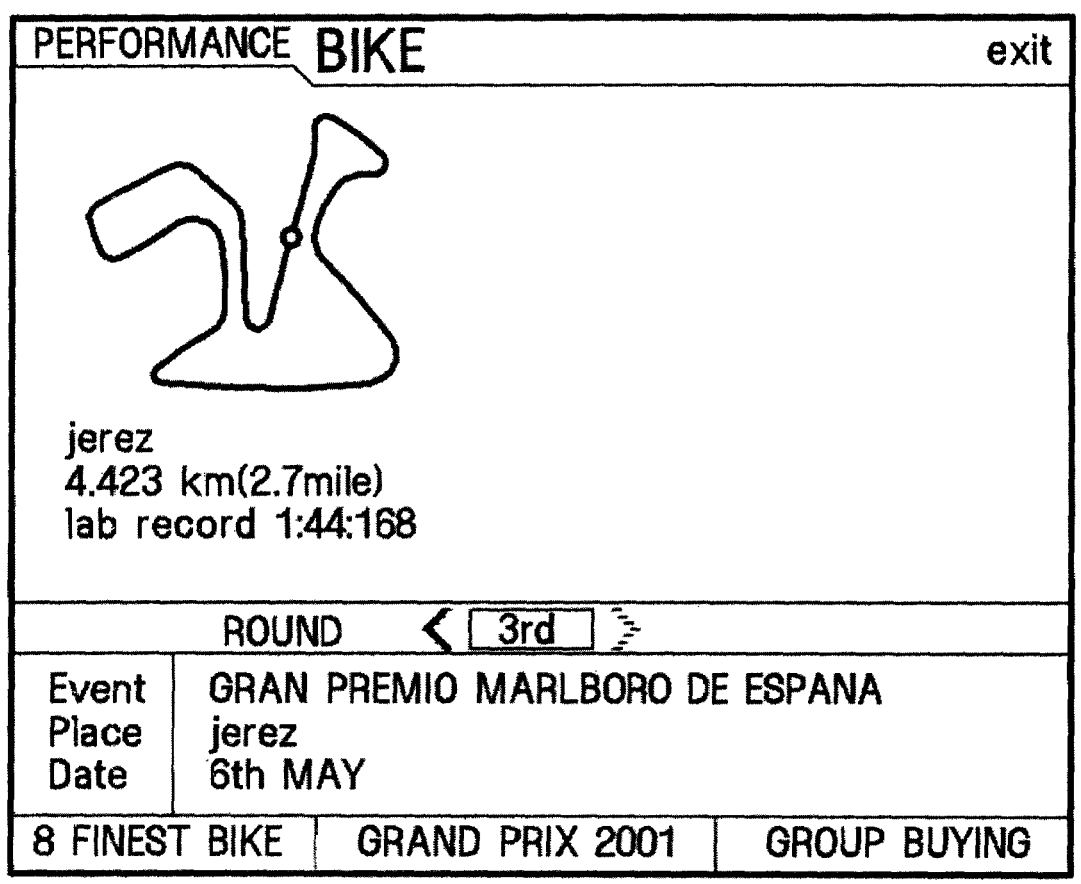
FIGS. 3A and 3B are diagrams illustrating a user interface (UI) image displayed on an apparatus that provides a preview of a menu object, according to exemplary embodiments of the present invention.
Figure 3B:
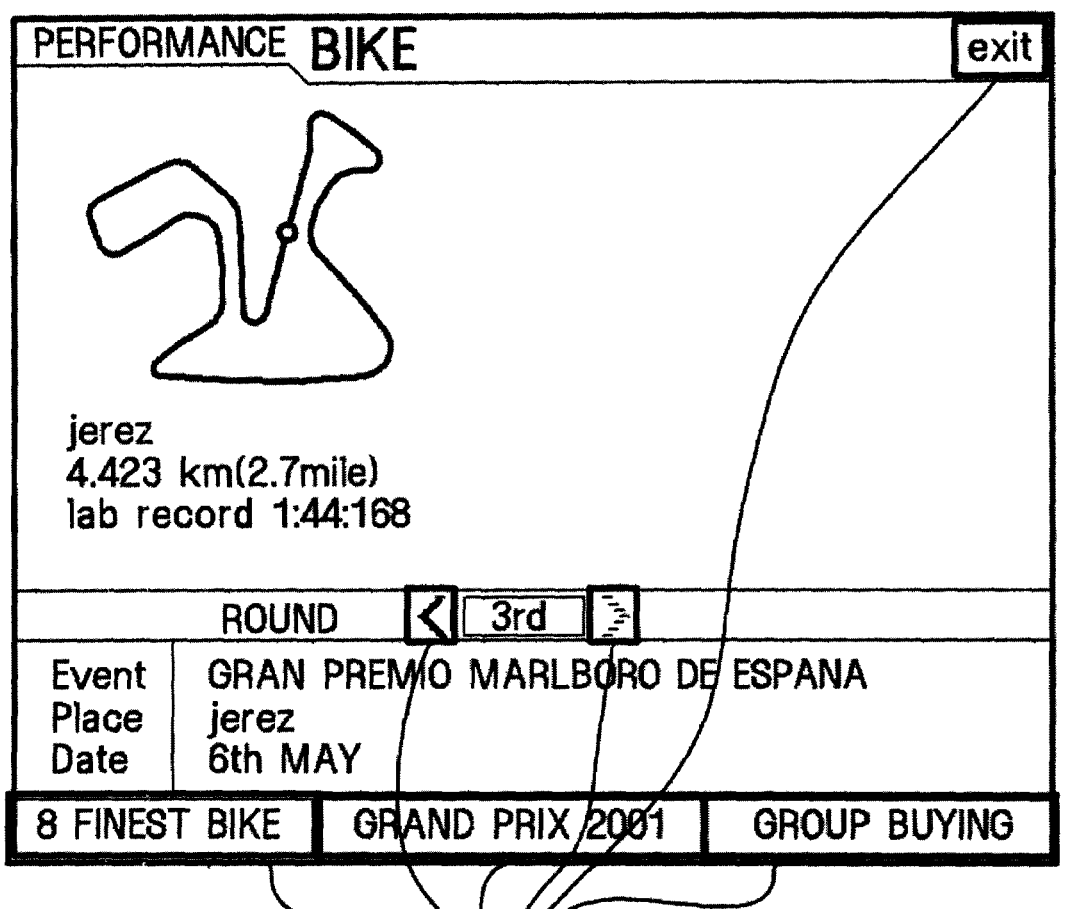

FIGS. 3A and 3B illustrate a UI screen image displayed on an apparatus that provides a preview of a menu object, according to exemplary embodiments of the present invention. Here, it is assumed that registration of a predetermined object has been completed and an operation corresponding to the registered object is set.

As illustrated in FIGS. 2 and 3A, a predetermined object, such as an '<' object, is activated in the screen image that is currently reproduced on the display device 100. In this case, when a user selects a 'menu preview' menu via the input device 110, such as a remote controller, the event processing unit 130 determines the type of a key event selected by the user.

If it is determined that the key event requests a menu preview, the visible object determining unit 140 determines whether visible objects are included in objects displayed in the currently reproduced screen image.

If the visible object determining unit 140 determines that visible objects are present in the currently reproduced screen image, the event processing unit 130 provides highlighting 20 on the visible objects as illustrated in FIG. 3B. The highlighting 20 on the visible objects may be presented with various colors and in various formats.

Accordingly, as illustrated in FIG. 3B, since the highlighting 20 is provided on available objects (visible objects), the user can recognize available menus at a first glance.

Figure 4:
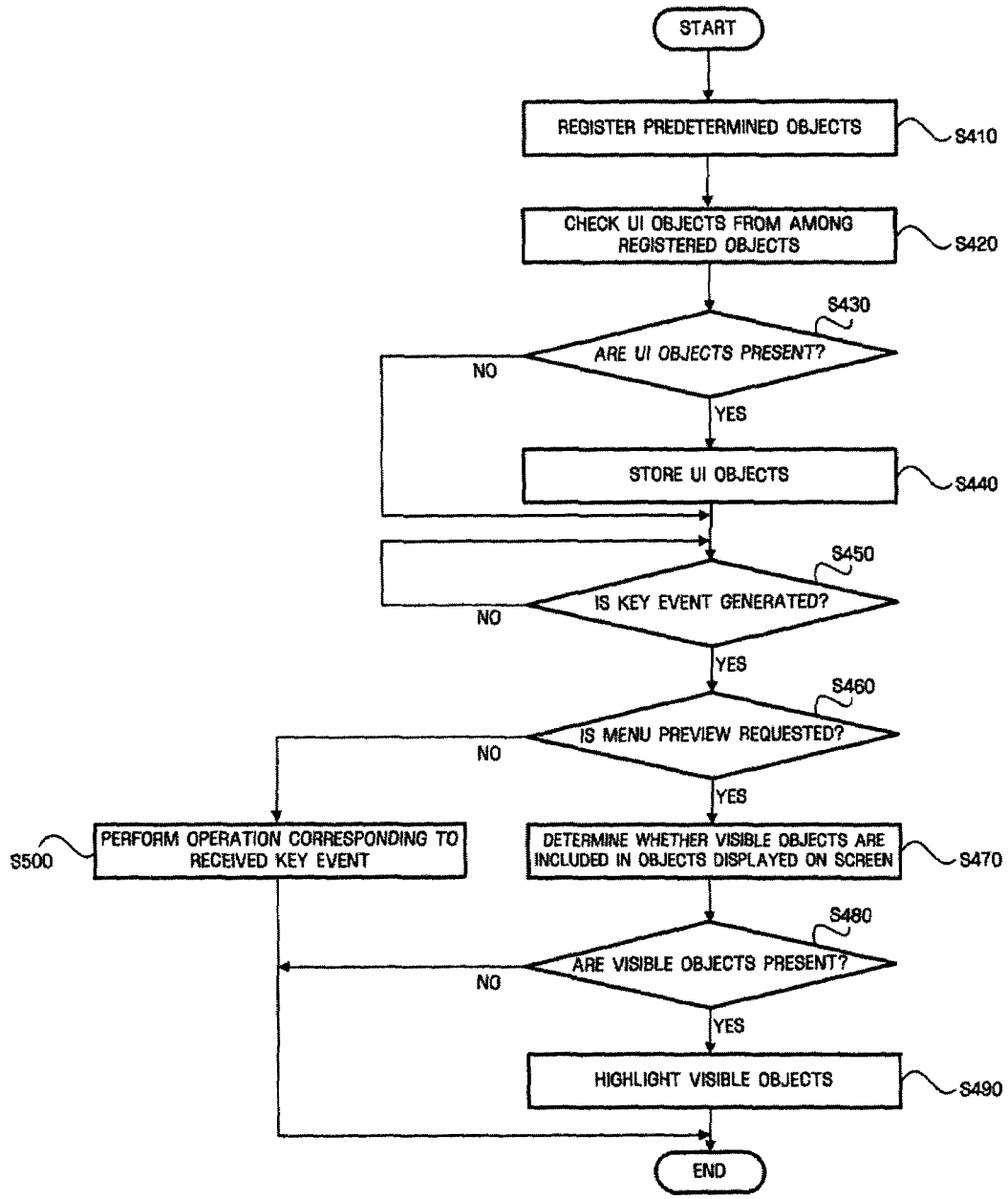
FIG. 4 is a flowchart illustrating a method of providing a preview of a menu object, according to an exemplary embodiment of the present invention.

FIG. 4 is a flowchart illustrating a method of providing a preview of a menu object, according to an exemplary embodiment of the present invention.

Referring to FIGS. 2 and 4, first, when a user requests registration of objects via the input unit 110, the object setting unit 120 registers the objects and sets an operation corresponding to each of the registered objects (operation S410).

Next, the object setting unit 120 determines whether UI objects are included in the registered objects (operation S420). Whether an object is a UI object may be determined by determining whether the object is a child object of a component class. If it is determined that UI objects are included in the registered objects (operation S430), the controller 170 stores the UI objects in the UI storage module of the storage unit 150 (operation S440).

Next, if a user generates a key event (S450), the input unit 110 receives the generated key event, and the event processing unit 130 determines the type of the received key event.

If it is determined that the received key event is a 'menu preview' event (operation S460), the event processing unit 130 requests the visible object determining unit 140 to determine whether visible objects are included in objects displayed in a screen image that is currently reproduced in display device 100.

Then, the visible object determining unit 140 searches UI objects stored in the storage unit 150 for the objects displayed in the currently reproduced screen image, and determines whether visible objects are present in the searched objects (operation S470). Here, whether an object is a visible object or an invisible object may be determined by a value of a method for the component class, i.e., is Visible( ).

If it is determined that visible objects are included in the objects in the currently reproduced screen image reproduced (operation S480), the event processing unit 130 requests the controller 170 to provide the highlighting 20 on the visible objects.

Next, the controller 170 controls the display unit 160 to provide the highlighting 20 on the visible objects in the currently reproduced screen image (operation S490). The highlight 20 may be presented with various colors and in various formats.

If it is determined in operation S480 that visible objects are not included in the objects in the currently reproduced screen image, the highlighting 20 is not provided on the objects in the screen image on the display device 100.

Also, if it is determined in operation S460 that the received key event is not the 'menu preview' event, the event processing unit 130 performs a predetermined operation corresponding to the received key event (operation S500). The predetermined operation may be volume control, channel change, or the like.

Also, if it is determined in operation S450 that a key event is not generated, the input unit 110 waits until the user generates a key event.

The above apparatus and method for providing a preview of a menu object, according to the exemplary embodiment of the present invention, have one or more advantages as follows.

A 'menu preview' function is provided to a user so the user can easily get accustomed to the menu of a downloaded broadcast application.

Also, available menu objects are highlighted, and thus, the user can recognize the available menu objects on a screen at a first glance.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present exemplary embodiments be considered in all respects as illustrative and not restrictive, reference being made to the appended claims rather than the foregoing description to indicate the scope of the invention.

What is claimed is:

1. An apparatus for providing a preview of a menu object, the apparatus comprising:
    an input unit which receives an event from a user while displaying available menu items of a current menu;
    an event processing unit which highlights at least one object, from among a plurality of registered objects, operable to receive a user input, when the received event is a menu preview event in which the available menu items of the current menu are highlighted; and
    a display unit which displays the highlighted object,
    wherein the event processing unit determines whether the received event is the menu preview event, and highlights all objects which are operable to receive the user input among the plurality of registered objects when the received event is determined to be the menu preview event,
    wherein the current menu is a menu of a downloaded broadcast application.

2. The apparatus of claim 1, further comprising:
    an object setting unit which determines user interface (UI) objects from among the plurality of registered objects; and
    a visible object determining unit which determines visible objects from among the determined UI objects in response to a request from the event processing unit, the visible objects being visually displayed on a screen currently reproduced by the display unit.

3. The apparatus of claim 2, further comprising a storage unit which separately stores only the determined UI objects.

4. The apparatus of claim 3, wherein the visible object determining unit checks an object from among the determined UI objects separately stored in the storage unit, and determines whether the checked object is visually displayed on the currently reproduced screen.

5. The apparatus of claim 2, wherein the event processing unit determines the determined visible objects as all the objects which are operable to receive the user input.

6. A method of providing a preview of a menu object in a display unit, the method comprising:
    receiving an event from a user while displaying available menu items of a current menu;
    highlighting at least one object, from among a plurality of registered objects, operable to receive a user input, when the received event is a menu preview event in which the available menu items of the current menu are highlighted; and displaying the highlighted object, wherein the highlighting the at least one object comprises determining whether the received event is the menu preview event, and highlighting all objects which are operable to receive the user input among the plurality of registered objects when the received event is determined to be the menu preview event, wherein the current menu is a menu of a downloaded broadcast application.

7. The method of claim 6, further comprising determining user interface (UI) objects from among the plurality of registered objects.

8. The method of claim 6, further comprising determining visible objects from among the determined UI objects, the visible objects being visually displayed on a screen currently reproduced.

9. The method of claim 7, wherein the determined UI objects are separately stored.

10. The method of claim 6, wherein the highlighting of the objects comprises:

- checking a UI object from among stored UI objects operable to receive a key event; and
- determining whether the checked UI object is currently visible on a screen.

\* \* \* \* \*